(12) United States Patent
An

(10) Patent No.: US 8,713,663 B2
(45) Date of Patent: Apr. 29, 2014

(54) METHOD FOR USING EXTENDED SECURITY SYSTEM, EXTENDED SECURITY SYSTEM AND DEVICES

(75) Inventor: Wanquan An, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 661 days.

(21) Appl. No.: 12/676,503

(22) PCT Filed: Aug. 15, 2008

(86) PCT No.: PCT/CN2008/072016
§ 371 (c)(1),
(2), (4) Date: Mar. 4, 2010

(87) PCT Pub. No.: WO2009/033388
PCT Pub. Date: Mar. 19, 2009

(65) Prior Publication Data
US 2010/0180342 A1    Jul. 15, 2010

(30) Foreign Application Priority Data
Sep. 4, 2007   (CN) .......................... 2007 1 0121336

(51) Int. Cl.
*H04L 29/06*    (2006.01)

(52) U.S. Cl.
USPC .................. 726/11; 714/4.1; 726/13; 726/23

(58) Field of Classification Search
USPC ............................................. 726/11; 714/4.1
See application file for complete search history.

(56) References Cited

U.S. PATENT DOCUMENTS 7,197,660 B1   3/2007  Liu et al.
7,941,837 B1 * 5/2011 Jiang et al. ...................... 726/11
2003/0018914 A1 * 1/2003 Cheng et al. ................... 713/201
2003/0131262 A1 * 7/2003 Goddard ........................ 713/201
2007/0156911 A1 * 7/2007 Menten .......................... 709/228
2007/0294754 A1 * 12/2007 Finkelstein et al. ............ 726/11

FOREIGN PATENT DOCUMENTS

| CN | 1758617 A | 4/2006 |
| CN | 1761240 A | 4/2006 |
| CN | 1949720 A | 4/2007 |
| CN | 101115010 A | 1/2008 |

* cited by examiner

*Primary Examiner* — Michael Simitoski
*Assistant Examiner* — Gary Lavelle
(74) *Attorney, Agent, or Firm* — Marshall, Gerstein & Borun LLP

(57) ABSTRACT

Embodiments of the present invention disclose a method for using an extended security system, including: configuring one of security processing devices in the extended security system as a primary security processing device and configuring other security processing devices as at least one secondary security processing device connected with the primary security processing device; the method further includes: when the extended security system receives an external packet, selecting, by the primary security processing device, a security processing device to process the received external packet, the selected security processing device being the primary security processing device or the secondary security processing device. The embodiments of the present invention also disclose an extended security system and a primary security processing device and secondary security processing devices. By data interaction between the security processing devices, resource sharing between the security processing devices can be implemented, thereby improving the performance of the extended security system.

6 Claims, 11 Drawing Sheets

METHOD FOR USING EXTENDED SECURITY SYSTEM, EXTENDED SECURITY SYSTEM AND DEVICES

FIELD OF THE INVENTION

The present invention relates to network communication technologies, and more particularly to a method for using an extended security system, an extended security system and devices.

BACKGROUND OF THE INVENTION

Internet is a network resource shared within the world, and various kinds of information are transmitted via the same medium. Therefore, it is necessary to protect sensitive data of users, especially for application scenes with high secret demands, such as military affairs, banks and the like, the security of data is particularly important. FIG. 1 is a schematic diagram illustrating a structure of a conventional security processing device. The security processing device shown in FIG. 1 includes a processing module and a primary control module. The processing module includes an interface processing module and a service processing module. The interface processing module has one or more interfaces connected to the outside of the security processing device, and is adapted to receive packets and send packets processed by the service processing module. The service processing module is adapted to receive the packets sent by the interface processing module, perform service processing for the packets, and send the processed packets via the interface processing module. The primary control module is adapted to manage and control the interface processing module and the service processing module.

Because of security problems brought by the attack and abuse of network viruses, the security processing device needs to process more and more security services. Along with the increase of the security services, the processing capacity of a single security processing device can not meet network security demands already. In order to meet the increasing network security demands, the security processing device is extended. The extension refers to that original two or multiple security processing devices are combined to form a security system, and the increasing security problems are solved through improving the processing capability.

FIG. 2 is a schematic diagram illustrating an extension of a conventional security system. According to the security system shown in FIG. 2, there is no data interaction between security processing devices. The extension in the prior art merely puts the security processing devices together on a physical location and does not realize the data interaction between the security processing devices, so each security processing device independently receives, processes and sends packets, which can not implement resource sharing and cooperation processing between the security processing devices.

For example, a security processing device A shown in FIG. 2 is connected to an external network 1 and an internal network 1, and a security processing device B shown in FIG. 2 is connected to an external network 2 and an internal network 2. In order to send a packet received from the external network 1 to the internal network 2 after the packet is processed, it is necessary to add an exchanger in the outside of the extended security system to implement communication between the internal network 1 and the internal network 2. In this way, the packet can enter the security processing device A from the external network 1, and then enter the internal network 2 through the internal network 1 and the newly added exchanger after the packet is processed by the security processing device A. For another example, the security processing device A has many packets to be processed currently; since the security processing device A and the security processing device B work independently, the security processing device B which is relatively idle can not assist the security processing device A to process the packets, which badly influences the processing capability of the whole security system and makes the processing capability of the security system limit to the processing capacity of a single security processing device. In view of the foregoing, the mode of extending the security system in the prior art needs to improve the performance of the extended security system.

SUMMARY OF THE INVENTION

Embodiments of the present invention provide a method for using an extended security system, an extended security system, a primary security processing device and secondary security processing devices.

The embodiments of the present invention provide a method for using an extended security system, including:

configuring one of security processing devices in the extended security system as a primary security processing device and configuring other security processing devices as at least one secondary security processing device connected with the primary security processing device, and the method further includes:

when the extended security system receives an external packet, selecting, by the primary security processing device, a security processing device to process the received external packet, the selected security processing device being the primary security processing device or the secondary security processing device.

The embodiments of the present invention further provide an extended security system, including:

a primary security processing device; and at least one secondary security processing device connected with the primary security processing device;

when the extended security system receives an external packet, the primary security processing device is adapted to select a security processing device to process the received external packet, the selected security processing device being the primary security processing device or the secondary security processing device.

The embodiments of the present invention further provide a primary security processing device, including:

an extended control interface module, connected respectively with a primary control module and secondary security processing devices, and adapted to receive request information from a secondary security processing device, and send instruction information generated by a primary control module to a secondary security processing device; and the primary control module, connected with the extended control interface module, and adapted to, when receiving a request for processing an external packet, select a secondary security processing device in an extended security system to process the external packet, generate the instruction information, and send the instruct information to the selected secondary security processing device via the extended control interface module.

The embodiments of the present invention further provide a secondary security processing device, including:

an extended control interface module, connected respectively with a primary control module and other security processing devices in an extended security system, and adapted to receive instruction information from a primary security processing device, and send a request for processing an external packet to the primary security processing device;

the primary control module, connected respectively with an interface module and the extended control interface module, and adapted to process the instruction information from the primary security processing device, instruct the interface module to record that a security processing device selected by the primary security processing device is used to process a traffic flow corresponding to the a first packet; wherein the primary control module is further adapted to send the request for processing the first packet to the primary security processing device via the extended control interface module; in the embodiments of the present invention, the traffic flow is composed of multiple data packets having the same quintuple or triple;

the interface module, connected respectively with the connection module and the primary control module, and adapted to receive the external packet, when the received external packet is the first packet, generate the request for processing the first packet and send the request to the primary control module, record that the security processing device selected by the primary security processing device is used to process the traffic flow corresponding to the first packet according the instruction of the primary control module, instruct the connection module to send the first packet to the security processing device selected by the primary security processing device to be processed; when the received external packet is a non-first packet, search out a security processing device used to process the non-first packet from recorded security processing devices, and instruct the connection module to send the received non-first packet to the searched out security processing device; and the connection module, connected respectively with the interface module and other security processing devices in the extended security system, adapted to send the received external packet to the security processing device selected by the primary control module to be processed according to the instruction of the interface module.

The embodiments of the present invention further provide a secondary security processing device, including:

an extended control interface module, connected respectively with a primary control module and other security processing devices in an extended security system, adapted to receive instruction information from a primary security processing device, and send state information of a service processing module to the primary security processing device;

the primary control module, connected respectively with the service processing module and the extended control interface module, and adapted to process the instruction information of the primary security processing device, instruct the connection module to receive an external packet from a security processing device selected by the primary security processing device;

wherein the primary control module is further adapted to obtain the state information of the service processing module, and send the state information to the primary security processing device via the extended control interface module;

the connection module, connected respectively with the service processing module and other security processing devices in the extended security system, and adapted to receive the external packet from the security processing device selected by the primary security processing device, and send the external packet to the service processing module to be processed; and the service processing module, connected respectively with the connection module and the primary control module, and adapted to send the state information of the service processing module to the primary control module, and process the external packet from the connection module.

In the method for using the extended security system and the extended security system provided by the embodiments of the present invention, one primary security processing device and at least one secondary security processing device connected with the primary security processing device are configured among security processing devices of the extended security system; when the extended security system receives an external packet, the primary security processing device selects a security processing device to process the received external packet, and the selected security processing device is the primary security processing device or the secondary security processing device. In this way, when the extended security system receives the external packet, the primary security processing device can select a security processing device with a processing capability to process the external packet, so that the processing capabilities of the security processing devices in the extended security system are harmonized, and the received external packet is sent to the security processing device selected by the primary security processing device to be processed. According to the above technical solution, interactions of control data and the external packet between the secondary security processing device and the primary security processing device are implemented, and resource sharing between the security processing devices is implemented, thereby improving the performance of the extended security system.

The embodiments of the present invention further provide security processing devices, which provide multiple possibilities for the extension of the security system. When only an interface needs to be extended, a security processing device only including an interface module may be used; when only the processing capability needs to be increased, a security processing device only including a service processing module may be used. In this way, system resources are fully saved, and adding devices to the security system according to extension demands of the security system can further improve the performance of the extended security system.

DETAILED DESCRIPTION OF THE INVENTION

In the prior art, the extension of a security system merely puts security processing devices together on a physical location and does not realize data interaction between the security processing devices, so each security processing device independently receives, processes and sends packets, which can not implement resource sharing and cooperation processing between the security processing devices.

Therefore, the embodiments of the present invention provide a method for using an extended security system, an extended security system, a primary security processing device and secondary security processing devices. In the embodiments of the present invention, one of security processing devices of an extended security system is configured as a primary security processing device and the other security processing devices are configured as at least one secondary security processing device connected with the primary security processing device. When the extended security system receives an external packet, a security processing device is selected to process the received external packet, and the selected security processing device may be the primary security processing device or the secondary security processing device. As can be seen, data interaction between the primary security processing device and the secondary security processing device is implemented and processing capabilities of the security processing devices are combined reasonably, so resource sharing and cooperation processing between the security processing devices are implemented, thereby improving the performance of the extended security system.

The embodiments of the present invention will be further described hereinafter with reference to the accompanying drawings, but the present invention is not limited to the embodiments. In the embodiments of the present invention, the same reference sign represents identical or similar steps, modules or units.

Figure 1:
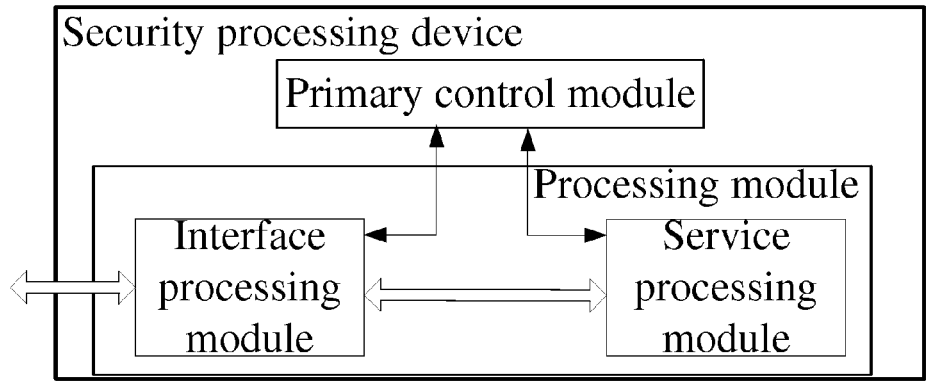
FIG. 1 is a schematic diagram illustrating a structure of a conventional security processing device.
Figure 2:
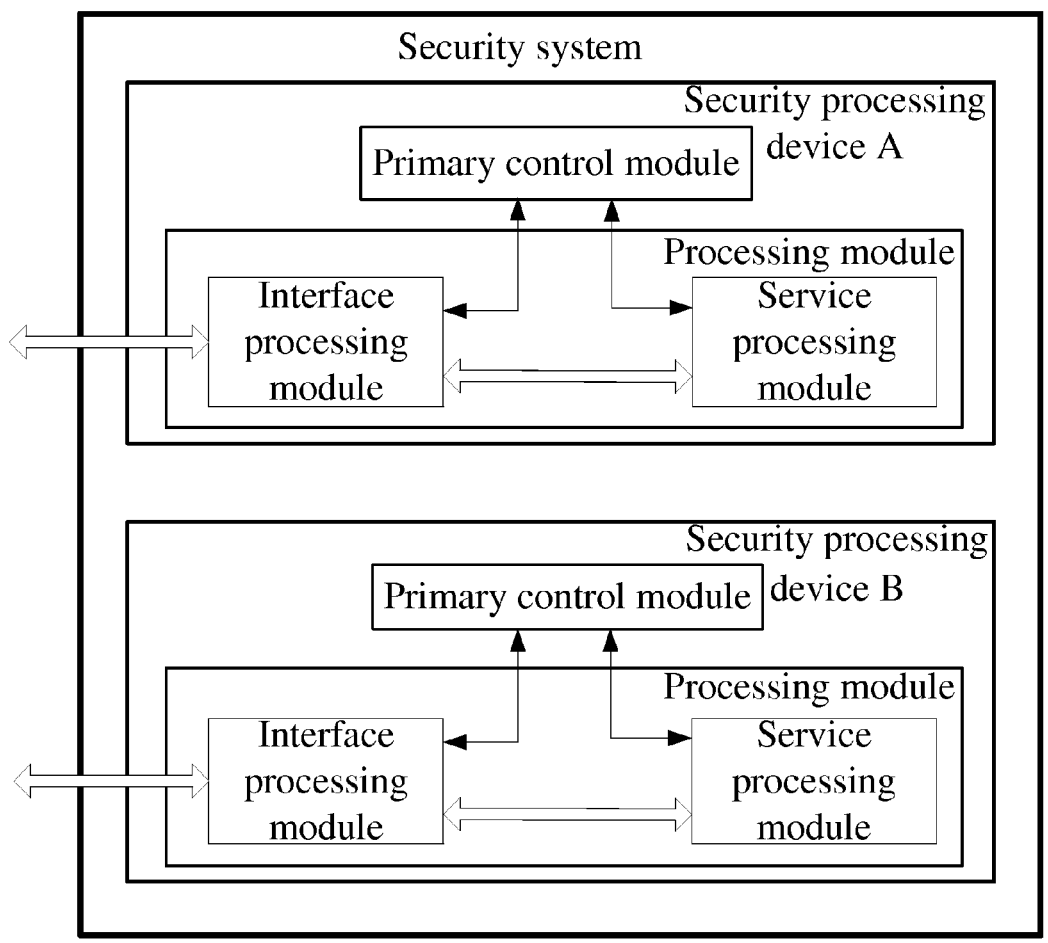
FIG. 2 is a schematic diagram illustrating a structure of a conventional security system.
Figure 3:
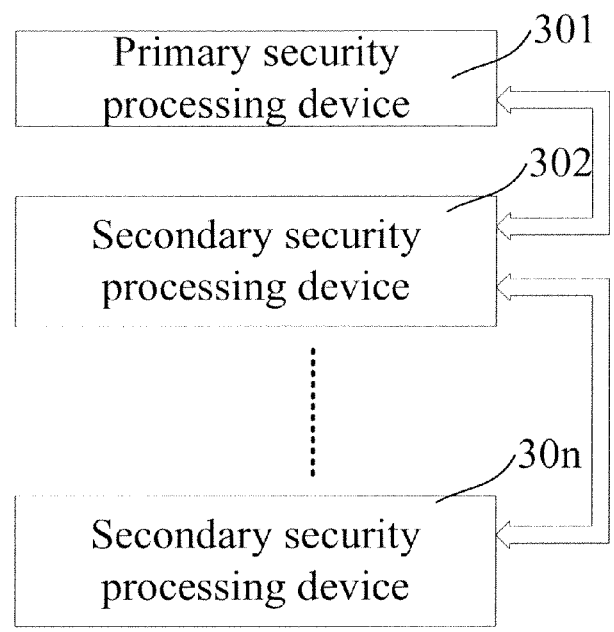
FIG. 3 is a schematic diagram illustrating a structure of an extended security system in accordance with a first embodiment of the present invention.

FIG. 3 is a schematic diagram illustrating a structure of an extended security system in accordance with a first embodiment of the present invention. The extended security system includes a primary security processing device 301, a secondary security processing device 302, . . . and a secondary security processing device 30*n*. In the extended security system shown in FIG. 3, the primary security processing device 301, the secondary security processing device 302, . . . and the secondary security processing device 30*n* are connected in series. When a certain security processing device in the extended security system receives an external packet, the primary security processing device 301 selects a security processing device in the extended security system to process the received external packet.

For example, when the secondary security processing device 302 receives the external packet, the primary security processing device 301 selects the secondary security processing device 30*n* to process the received external packet. The secondary security processing device 302 regards the received external packet as a packet to be processed, and sends the packet to the selected secondary security processing device 30*n* via a connection module of the secondary security processing device 302 to be processed Preferably, the primary security processing device 301 may also select the secondary security processing device 302 itself to process the received external packet. In the extended security system shown in FIG. 3, it also may be the primary security processing device 301 that receives the external packet.

In the first embodiment of the present invention shown in FIG. 3, the extended security system includes multiple security processing devices (includes the primary security processing device and multiple secondary security processing devices). In order to improve the processing efficiency of packets, one type of packets may be processed by one security processing device. In this embodiment, preferably, one type of packets may be called as a traffic flow. In this embodiment, preferably, the primary security processing device 301 selects the security processing device used to process a specific traffic flow according to state information of each security processing device, and the state information may be the processing capability of each security processing device. The security processing device used to process the specific traffic flow may be selected when a first packet of the traffic flow is received; or the originally selected security processing device is searched out to process the specific traffic flow when a non-first packet is received.

For example, when receiving the first packet of the traffic flow, the secondary security processing device 302 sends a processing request to the primary security processing device 301, and the primary security processing device selects a certain security processing device from the primary security processing device 301, the secondary security processing device 302, . . . and the secondary security processing device 30*n* to process the first packet. For example, when selecting the primary security processing device 301 to process the first packet, the primary security processing device 301 instructs the secondary security processing device 302 to send the first packet to the primary security processing device 301, and instructs the secondary security processing device 302 to record that the primary security processing device 301 is used to process the traffic flow corresponding to the first packet. Therefore, the secondary security processing device 302 records that the primary security processing device 301 is used to process the traffic flow corresponding to the first packet. In this way, when receiving a non-first packet of the traffic flow, the secondary security processing device 302 searches the above record, determines that the non-first packet is processed by the primary security processing device 301, and thus sends the non-first packet to the primary security processing device 301 to be processed.

Preferably, it may also be the primary security processing device 301 that receives the first packet. For example, when receiving the first packet, the primary security processing device 301 selects the secondary security processing device 302 to process the first packet. The primary security processing device 301 may select the secondary security processing device 302 according to state information of the primary security processing device 301, the secondary security processing device 302, . . . and the secondary security processing device 30*n*. The state information may be the processing capability of the security processing devices. For example, the primary security processing device 301 may select a security processing device with more processing capability to process the first packet, which can improve the processing efficiency of the extended security system. Hence, the primary security processing device 301 sends the first packet to the secondary security processing device 302 to be processed, and records that the secondary security processing device 302 is used to process the traffic flow corresponding to the first packet. In this way, when receiving the non-first packet, the primary security processing device 301 searches the record in the primary security processing device 301 and determines that the non-first packet is processed by the secondary security processing device 302.

In the above first embodiment, the record that the security processing device selected by the primary security processing device is used to process the traffic flow corresponding to the first packet may be incarnated by a mapping table. The mapping table represents mapping relations between the security processing devices and the traffic flow corresponding to the first packet, so that the security processing device receiving the non-first packet can search the mapping table to obtain the security processing device which can process the non-first packet of the traffic flow.

In the first embodiment shown in FIG. 3, the external packet refers to a packet sent from the outside to the extended security system. In the first embodiment shown in FIG. 3, each security processing device is connected to a network segment corresponding to the security processing device, so as to receive and process packets from the network segment and send packets to the network segment. After the security processing device processes a received packet, if the processed packet needs to be sent out, a security processing device for sending the packet to be sent may be determined according to a destination IP address of the packet to be sent. When being not the currently determined security processing device, the security processing device processing the packet sends the packet to be sent to the determined security processing device; the determined security processing device receives the packet to be sent, and sends the packet according the destination IP address of the packet. When being the currently determined security processing device, the security processing device processing the packet sends the packet according to the destination IP address of the packet.

In the first embodiment shown in FIG. 3, preferably, one of the security processing devices connected with each other in the extended security system is determined as the primary security processing device 301 through negotiation among the security processing devices, and other security processing devices are determined as the secondary security processing devices; or the primary security processing device and the secondary security processing devices in the extended security system are determined according to pre-configuration.

In the embodiments of the present invention, there are multiple structures of the primary security processing device and the secondary security processing device. A second embodiment, a third embodiment, a fourth embodiment, a fifth embodiment, a sixth embodiment, a seventh embodiment and an eighth embodiment of the present invention respectively describes different structures of the primary security processing device and the secondary security processing device.

Figure 4:
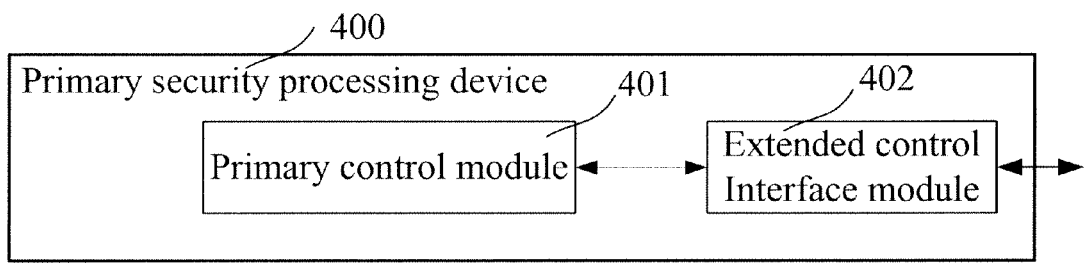
FIG. 4 is a schematic diagram illustrating a structure of a primary security processing device in accordance with a second embodiment of the present invention.

FIG. 4 is a schematic diagram illustrating a structure of a primary security processing device in accordance with the second embodiment of the present invention. FIG. 4 shows a primary security processing device 400 including a primary control module 401 and an extended control interface module 402.

The extended control interface module 402 is connected respectively with the primary control module 401 and secondary security processing devices, and is adapted to receive request information from a secondary security processing device, and send instruction information generated by the primary control module 401 to the secondary security processing device.

The primary control module 401 is connected with the extended control interface module 402, and is adapted to select one secondary security processing device in the extended security system to process an external packet when receiving a request for processing the external packet, generate instruction information, and send the instruction information to the selected secondary security processing device via the extended control interface module 402.

Figure 5:
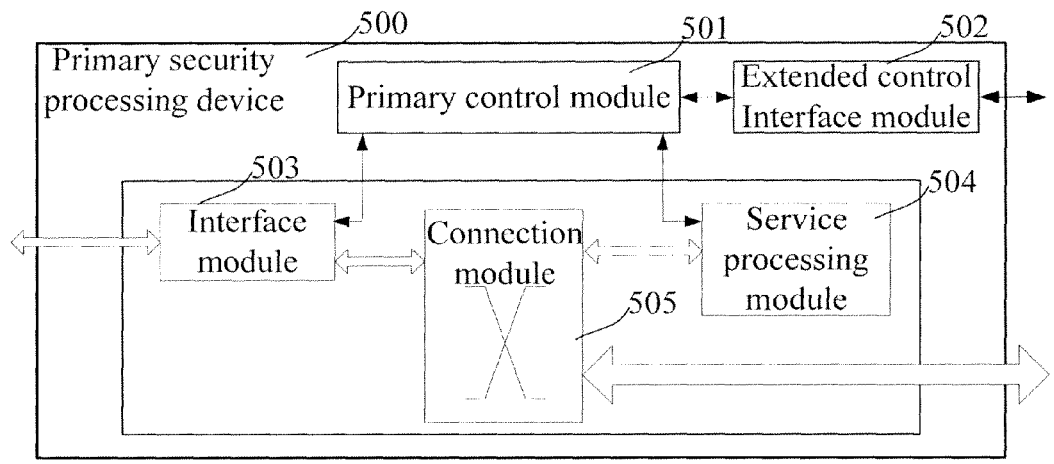
FIG. 5 is a schematic diagram illustrating a structure of a primary security processing device in accordance with a third embodiment of the present invention.

FIG. 5 is a schematic diagram illustrating a structure of a primary security processing device in accordance with the third embodiment of the present invention. FIG. 5 shows a primary security processing device 500 including a primary control module 501, an extended control interface module 502, an interface module 503, a service processing module 504 and a connection module 505.

The interface module 503 is connected respectively with the connection module 505 and the primary control module 501, and is adapted to receive an external packet; when the received external packet is a first packet of a traffic flow, send a request for processing the first packet to the primary control module 501; when the received external packet is a non-first packet, search out a security processing device used to process the non-first packet from security processing devices recorded in the interface module 503, and send the non-first packet to the searched out security processing device via the connection module 505.

The connection module 505 is connected respectively with the interface module 503, the service processing module 504 and secondary security processing devices, and is adapted to send the external packet to a selected secondary security processing device to be processed or receive the processed external packet from the selected secondary security processing device.

The service processing module 504 is connected respectively with the connection module 505 and the primary control module 501, and is adapted to process the external packet sent by the connection module 505 according to an instruction of the primary control module 501.

The extended control interface module 502 is connected respectively with the primary control module 501 and the secondary security processing devices, and is adapted to receive request information of the secondary security processing device, and send instruction information generated by the primary control module 501 to the secondary security processing device.

The primary control module 501 is adapted to, when receiving the request for processing the first packet, select a security processing device to process the first packet according to state information of the secondary security processing devices sent by the extended control interface module 502 and state information of the service processing module 504; when selecting a secondary security processing device to process the first packet, generate instruction information for indicating that the received first packet needs to be sent to the selected secondary security processing device, and instruct the security processing device receiving the first packet to record that the selected secondary security processing device is used to process the traffic flow corresponding to the first packet; When selecting the primary security processing device to process the first packet, instruct the service processing module 504 to process the first packet received, via the connection module 505, from the security processing device receiving the first packet, and instruct the interface module of the security processing device receiving the first packet to record that the primary security processing device is used to process the traffic flow corresponding to the first packet.

Figure 6:
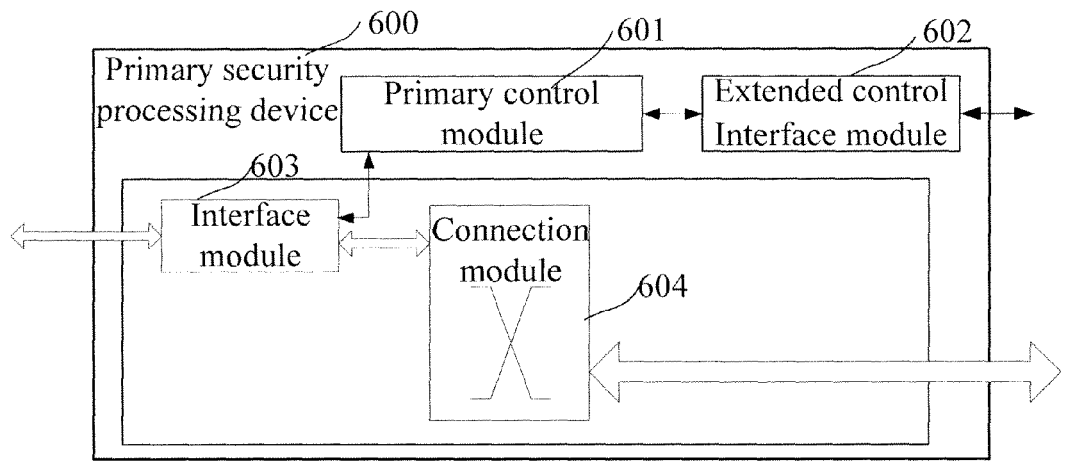
FIG. 6 is a schematic diagram illustrating a structure of a primary security processing device in accordance with a fourth embodiment of the present invention.

FIG. 6 is a schematic diagram illustrating a structure of a primary security processing device in accordance with a fourth embodiment of the present invention. FIG. 6 shows a primary security processing device 600 including a primary control module 601, an extended control interface module 602, an interface module 603 and a connection module 604.

The interface module 603 is connected respectively with the connection module 604 and the primary control module 601, and is adapted to receive an external packet; when the received external packet is a first packet of a traffic flow, send a request for processing the first packet to the primary control module 601; when the received external packet is a non-first packet, search out a security processing device used to process the non-first packet from security processing devices recorded in the interface module 603, and send the non-first packet to the searched out security processing device via the connection module 604.

The connection module 604 is connected respectively with the interface module 603 and the secondary security processing devices, and is adapted to send the received external packet to a secondary security processing device selected by the primary control module 601.

The primary control module 601 is connected respectively with the interface module 603 and the extended control interface module 602, and is adapted to, when receiving the request of processing the first packet, select a secondary security processing device to process the first packet according to state information of the secondary security processing devices, generate instruction information for instructing the interface module 603 to send the received first packet to the selected secondary security processing device, and further instruct the interface module 603 to record that the secondary security processing device selected by the primary control module 601 is used to process the traffic flow corresponding to the first packet.

The extended control interface module 602 is connected respectively with the primary control module 601 and the secondary security processing devices, and is adapted to receive request information of the secondary security processing device, and send the instruction information generated by the primary control module 601 to the secondary security processing device.

Figure 7:
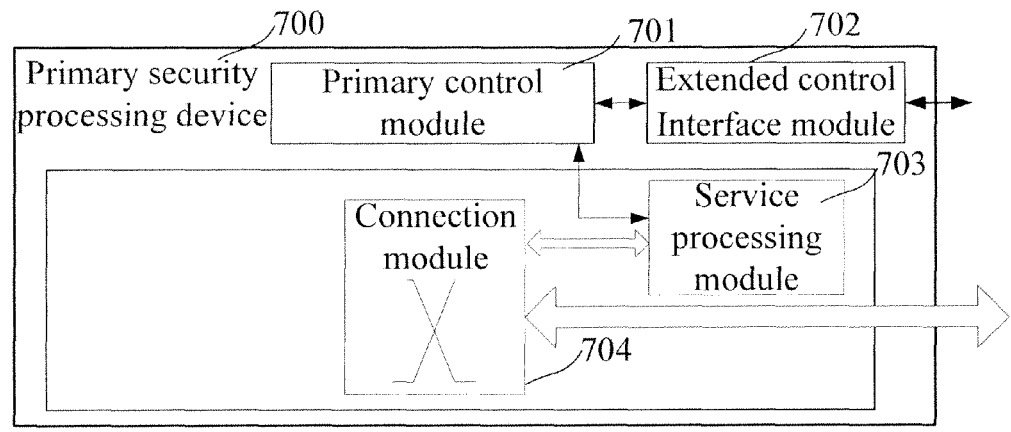
FIG. 7 is a schematic diagram illustrating a structure of a primary security processing device in accordance with a fifth embodiment of the present invention.

FIG. 7 is a schematic diagram illustrating a structure of a primary security processing device in accordance with a fifth embodiment of the present invention. FIG. 7 shows a primary security processing device 700 including a primary control module 701, an extended control interface module 702, a service processing module 703 and a connection module 704.

The connection module 704 is connected respectively with the service processing module 703 and secondary security processing devices, and is adapted to receive an external packet sent from a secondary security processing device and send the external packet to the service processing module 703 to be processed.

The service processing module 703 is connected respectively with the connection module 704 and the primary control module 701, and is adapted to process the external packet received by the connection module 704 according to an instruction of the primary control module 701.

The primary control module 701 is connected respectively with the extended control interface module 702 and the service processing module 703, and is adapted to, when receiving a request for processing a first packet received by the extended control interface 702, select a secondary security processing device or the service processing module 703 to process the first packet according to state information of the secondary security processing devices and the state information of the service processing module 703; when selecting the secondary security processing device to process the first packet, generate instruction information for indicating that the selected secondary security processing device is used to process the first packet, and send out the instruction information via the extended control interface module 702; when selecting the service processing module 703 to process the first packet, instruct the secondary security processing device receiving the first packet to send the first packet to the connection module 704, and instruct the service processing module 703 to process the first packet; and instruct the secondary security processing device receiving the first packet to record that the security processing device selected by the primary control module 701 is used to process a traffic flow corresponding to the first packet.

The extended control interface module 702 is connected respectively with the primary control module 701 and the secondary security processing devices, and is adapted to receive request information of the secondary security processing device, and send the instruction information generated by the primary control module 701 to the secondary security processing device.

In the above third embodiment of the present invention, there preferably may be two or more than two interface modules 503 or service processing modules 504 which are connected respectively with the connection module and the primary control module, and connection relations and work principles of the two or more than two interface modules 503 or service processing modules 504 are the same as those of the interface module 503 or the service processing module 504 shown in FIG. 5. In the above fourth embodiment of the present invention, there preferably may be two or more than two interface modules 603 which are connected respectively with the connection module and the primary control module, and connection relations and work principles of the two or more than two interface modules 603 are the same as those of the interface module 603 shown in FIG. 6. In the above fifth embodiment of the present invention, there preferably may be two or more than two service processing modules 703 which are connected respectively with the connection module and the primary control module, and connection relations and work principles of the two or more than two service processing modules 703 are the same as those of the service processing module 703 shown in FIG. 7.

Figure 8:
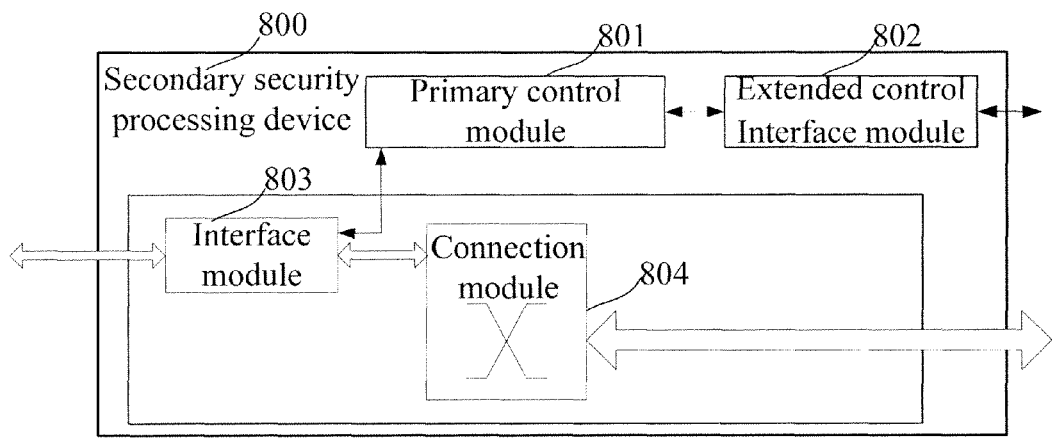
FIG. 8 is a schematic diagram illustrating a structure of a secondary security processing device in accordance with a sixth embodiment of the present invention.

FIG. 8 is a schematic diagram illustrating a structure of a secondary security processing device in accordance with a sixth embodiment of the present invention. FIG. 8 shows a secondary security processing device 800 including a primary control module 801, an extended control interface module 802, an interface module 803 and a connection module 804. Connection relations of the modules are the same as those of the modules in the primary security processing device 600 shown in FIG. 6, and are not further described herein. Only work principles of the modules are described hereinafter.

The extended control interface module 802 is adapted to receive instruction information from the primary security processing device, and send a request for processing an external packet to the primary security processing device.

The primary control module 801 adapted to process the instruction information from the primary security processing device instruct the interface module 803 to record that a security processing device elected by the primary security processing device is used to process a traffic flow corresponding to a first packet, and send a request for processing the first packet from the interface module 803 to the primary security processing device via the extended control interface module 802.

The interface module 803 is adapted to receive an external packet; when the received external packet is the first packet, generate a request for processing the first packet, send the request to the primary control module 801, record, according, the instruction of the primary control module 801 that the security processing device selected by the primary security processing device is used to process the traffic flow corresponding to the first packet, and instruct the connection module 804 to send the first packet to the security processing device selected by the primary security processing device to be processed; when the received external packet is a non-first packet, search out a security processing device used to process the non-first packet from recorded security processing devices, and instruct the connection module 804 to send the received non-first packet to the searched out security processing device.

The connection module 804 is adapted to send according to the instruction of the interface module 803, the received external packet to the security processing device selected by the primary control module to be processed.

Figure 9:
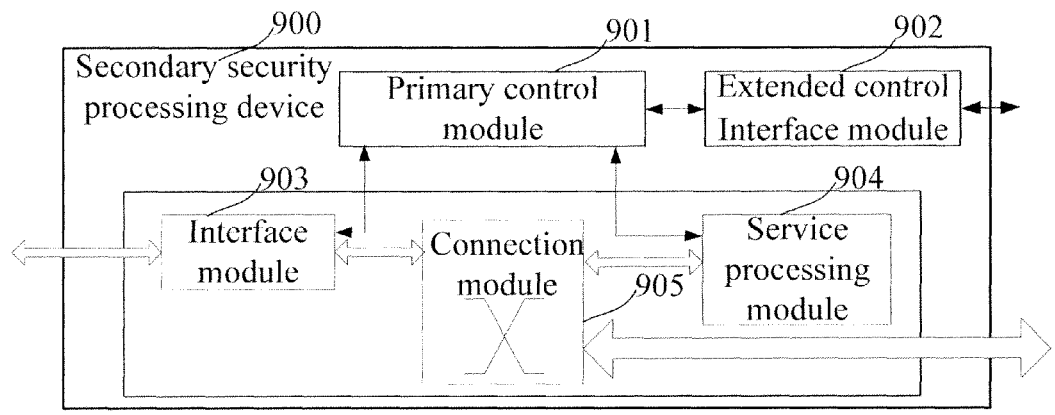
FIG. 9 is a schematic diagram illustrating a structure of a secondary security processing device in accordance with a seventh embodiment of the present invention.

FIG. 9 is a schematic diagram illustrating a structure of a secondary security processing device in accordance with a seventh embodiment of the present invention. FIG. 9 shows a secondary security processing device 900 including a primary control module 901, an extended control interface module 902, an interface module 903, a service processing module 904 and a connection module 905. Connection relations of the modules are the same as those of the modules in the primary security processing device 500 shown in FIG. 5, and are not further described herein. Only work principles of the module are described hereinafter. In the seventh embodiment, the functions of the primary control module 901, the extended control interface module 902, the interface module 903 and the connection module 905 are respectively the same as the functions of the primary control module 801, the extended control interface module 802, the interface module 803 and the connection module 804, and are not further described herein. Only the functions of the newly added service processing module 904 and the functions of the newly added primary control module 901 are described hereinafter.

The service processing module 904 is adapted to process an external packet received by the connection module 905 according to an instruction of the primary control module 901, and send state information of the service processing module 904 to the primary control module 901.

The primary control module 901 is further adapted to instruct, according to the instruction received by the extended control interface module 902 from the primary security processing device, the service processing module 904 to process the external packet received by the connection module 905, obtain the state information of the service processing module 904 from the service processing module 904, and send the state information of the service processing module 904 via the extended interface module 902.

Figure 10:
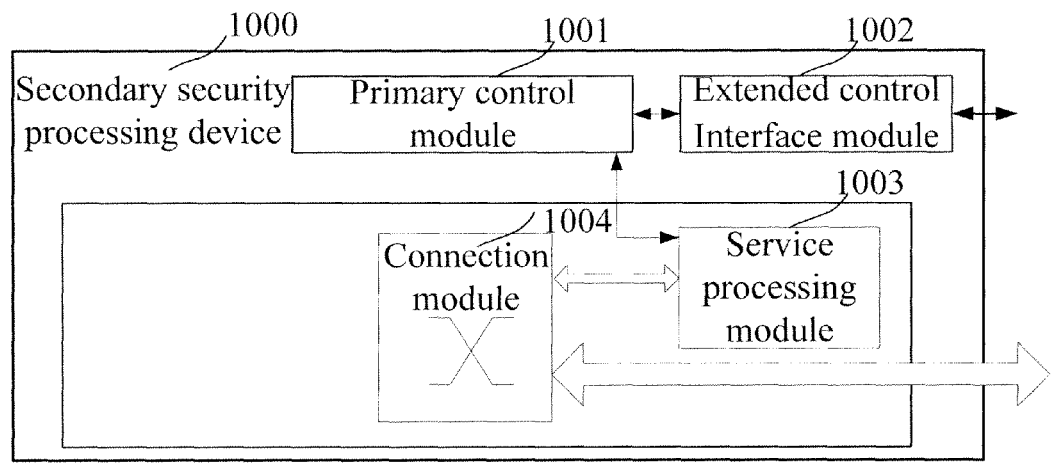
FIG. 10 is a schematic diagram illustrating a structure of a secondary security processing device in accordance with an eighth embodiment of the present invention.

FIG. 10 is a schematic diagram illustrating a structure of a secondary security processing device in accordance with an eighth embodiment of the present invention. FIG. 10 shows a secondary security processing device 1000 including a primary control module 1001, an extended control interface module 1002, a service processing module 1003 and a connection module 1004. Connection relations of the modules are the same as those of the modules in the primary security processing device 700 shown in FIG. 7, and are not further described herein. Only work principles of the module are described hereinafter.

The extended control interface module 1002 is adapted to receive instruction information from the primary security processing device, and send state information of the service processing module 1003 to the primary security processing device.

The primary control module 1001 is adapted to process the instruction information of the primary security processing device, instruct the connection module 1004 to receive an external packet from the security processing device selected by the primary security processing device, obtain the state information of the service processing module 1003, and send the state information of the service processing module 1003 to the primary security processing device via the extended control interface module 1002.

The connection module 1004 is adapted to receive the external packet from the security processing device selected by the primary security processing device, and send the external packet to the service processing module 1003 to be processed.

The service processing module 1003 is adapted to report its own state information to the primary control module 1001, and process the external packet sent from the connection module 1004.

In the above sixth embodiment, there preferably may be two or more than two interface modules 803 which are connected respectively with the connection module and the primary control module, and connection relations and work principles of the two or more than two interface modules 803 are the same as those of the interface module 803 shown in FIG. 8. In the above seventh embodiment, there preferably may be two or more than two interface modules 903 or the service processing modules 904 which are connected respectively with the connection module and the primary control module, and connection relations and work principles of the two or more than two interface modules 903 or the service processing modules 904 are the same as those of the interface module 903 or the service processing module 904 shown in FIG. 9. In the above eighth embodiment of the present invention, there preferably may be two or more than two service processing modules 1003 which are connected respectively with the connection module and the primary control module, and connection relations and work principles of the two or more than two service processing modules 1003 are the same as those of the service processing module 1003 shown in FIG. 10.

The embodiments of the present invention also provide an extended security system including one primary security processing device and at least one secondary security processing device connected with the primary security processing device. The primary security processing device is adapted to select a security processing device to process an external packet when the extended security system receives the external packet. The selected security processing device may be the primary security processing device or a secondary security processing device.

The extended security system provided by the embodiments of the present invention will be described hereinafter by taking the primary security processing devices and the secondary security processing devices described by above embodiments as an example.

Figure 11:
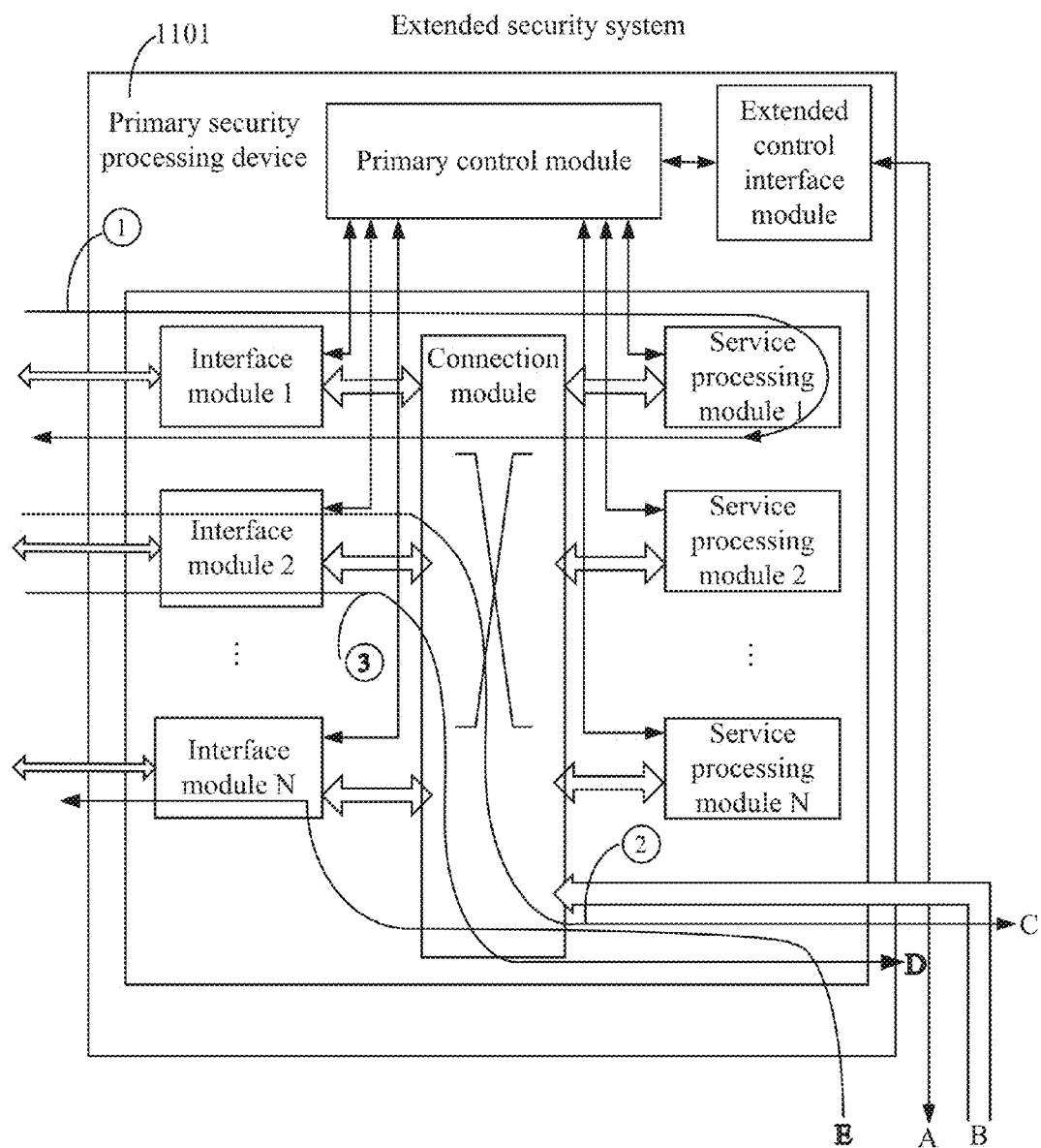
FIG. 11 is a schematic diagram illustrating a structure of a security system in accordance with a ninth embodiment of the present invention.
Figure 11:
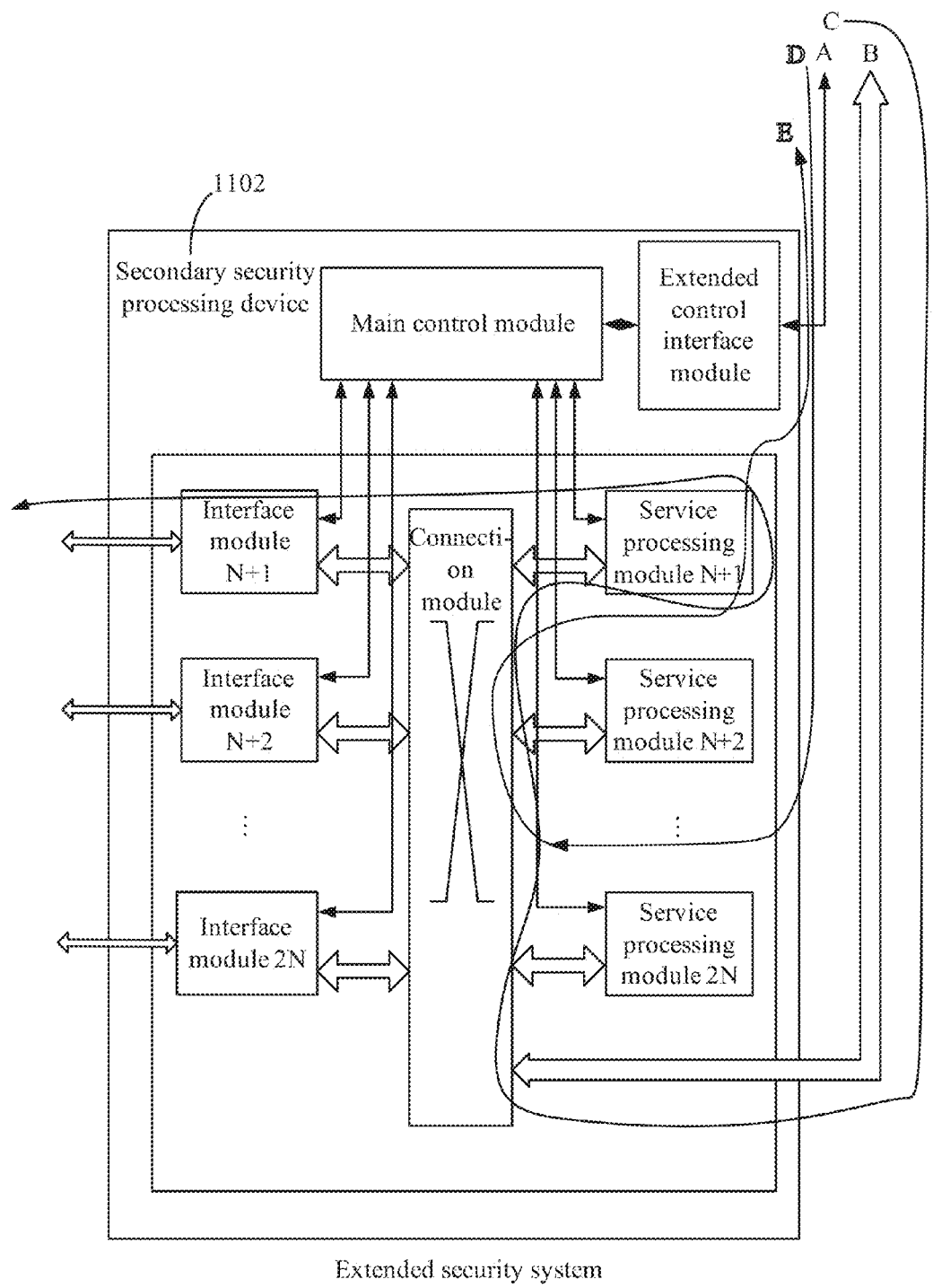

FIG. 11 is a schematic diagram illustrating a structure of a security system in accordance with a ninth embodiment of the present invention. The security system includes two security processing devices which are respectively a primary security processing device 1101 and a secondary security processing device 1102. Structures of the two security processing devices are the same, and both include a primary control module, an extended control interface module, a connection module, N interface modules and N service processing modules. Any one interface module is connected with any one service processing module via the connection module. The number of the interface modules in the primary security processing device or in the secondary security processing device may be the same as or different from the number of the service processing modules in the primary security processing device or in the secondary security processing device, which does not affect the implementation of the embodiments of the present invention.

The ninth embodiment is described by an example that the primary security processing device 1101 processes a packet. When the interface module in the primary security processing device 1101 receives a packet from the outside of the security system, a service processing module in the security system is selected to process the received packet. All service processing modules in the security system include service processing modules 1~N in the primary security processing device and service processing modules N+1~2N in the secondary security processing device 1102. The interface module sends the external packet and a processing instruction for describing the currently selected service processing module to the connection module. The processing instruction is generated by the primary control module, and preferably is generated by the primary control module according to process capabilities of the service processing modules 1~2N, or is generated by searching security processing devices recorded by the interface module. The searched record is the same as that described in the above embodiments of the present invention, and is not further described herein. When determining, according to the received processing instruction, that the selected service processing module is located at the security processing device where the connection module is located, the connection module sends the packet corresponding to the processing instruction to the selected service processing module to be processed, e.g. a signal flow ①. In FIG. 11, the signal flow ① represents that the packet is received from the interface module 1 in the primary security processing device 1101, and sent via the connection module to the service process module 1 in the primary security processing device 1101 to be processed; after processing the packet, the service processing module 1 sends the processed packet to the interface module 1 via the connection module in the primary security processing device 1101, and the interface module 1 sends the packet out.

The connection module sends the packet and the processing instruction to the security processing device corresponding to the service processing module according to the service processing module corresponding to the processing instruction. The packet is processed by the service processing module corresponding to the security processing device, e.g. signal flows ② and ③ shown in FIG. 11 which are represented as lines ② and ③.

As shown in FIG. 11, the signal flow 2 represents that the packet is received from the interface module 2 in the primary security processing device 1101, and sent via the connection modules in the primary security processing device and in the secondary security processing device to the service process module N+1 in the secondary security processing device 1102 to be processed; after processing the packet, the service processing module N+1 sends the processed packet to the interface module N+1 in the secondary security processing device 1102 via the connection module in the secondary security processing device 1102, and the interface module N+1 sends out the packet. The signal flow ③ represents that the packet is received from the interface module 2 in the primary security processing device 1101, and sent via the connection modules in the primary security processing device 1101 and in the secondary security processing device 1102 to the service process module N+1 in the secondary security processing device 1102 to be processed; after processing the packet, the service processing module N+1 sends the processed packet to the interface module N in the primary security processing device 1101 via the connection module in the secondary security processing device 1102, and the interface module N sends out the packet. In FIG. 11, the line of the signal flow ③ is not indicated herein.

The processing instruction described in the above embodiment of the present invention may be a MAC address of the service processing module. If the processing instruction is the MAC address of the service processing module, the connection module in the security processing device may maintain a forwarding table and send the packet to be processed to the service processing module according to the MAC address of the service processing module. Preferably, the processing instruction is sent via the extended control interface module, and the packet is sent via the connection module, therefore the service processing module selected by the primary control module can receive the packet to be processed.

The ninth embodiment is described by an example that the secondary security processing device 1102 processes the packet. The secondary security processing device receives the packet to be processed and the processing instruction for describing the service processing module used to process the packet from the primary security processing device 1101. The packet to be processed is sent via the connection module. For example, the signal flows □ and □ respectively pass through the connection module in the primary security processing device 1101 and the connection module in the secondary security processing device 1102. The processing instruction for describing the service processing module used to process the packet is sent via the extended control interface modules in the primary security processing device 1101 and in the secondary security processing device 1102. In order to simplify FIG. 11, this signal flow is not shown in FIG. 11. Preferably, the processing instruction for describing the service processing module used to process the packet may be sent together with the packet to be processed. The connection module in the secondary predigest 1102 sends the packet to the service processing module used to process the packet according to contents of the processing instruction, e.g. the signal flows □ and □ shown in FIG. 11.

After processing the packet sent by the primary security processing device 1101, the service processing module in the secondary security processing device 1102 determines the interface module used to send the packet according to the IP address of the packet, and sends the processed packet and a sending instruction for describing the interface module to the connection module. The connection module receives the packet and the sending instruction sent by the service processing module; when determining, according to the sending instruction, that the interface module described by the sending instruction is not located in the security processing device where the connection module is located, sends, according to the service processing module corresponding to the sending instruction, the packet and the sending instruction to the security processing device including the interface module used to send the packet. For example, the signal flow □ shown in FIG.

11 is on the interface module N of the primary security processing device 1101. When determining that the interface module described by the sending instruction is located in the security processing device where the connection module is located, the connection module sends the packet and the sending instruction to the interface module to be sent out, e.g. signal flow □ shown in FIG. 11. Preferably, the sending instruction for describing the interface module may be sent via the extended control interface module rather than be sent together with the processed packet via the connection module, so that the processed packet is sent via the determined interface module under the control of the primary control module.

Herein, determining the interface module used to send the packet according to the IP address of the packet to be sent may be performed according to a forwarding table stored by the service processing module. The forwarding table records the interface module used to send the packet to the destination IP address. The forwarding table may be configured in advance or be obtained by learning.

In addition, the above sending instruction may be the MAC address of the interface module, and then the connection module needs to maintain its own MAC address forwarding table, and sends the packet to the interface module according to the MAC address of the interface module used to send the packet to be sent.

The connection module in the primary security processing device 1101 receives the packet processed by the secondary security processing device 1102 and the sending instruction for describing the interface module used to send the packet, and sends the packet and the sending instruction to the connection module. The connection module sends the received packet to the interface module described by the sending instruction. The interface module sends the received packet, e.g. the signal flow □ described above.

In this embodiment, the interface module may select the service processing module used to process the currently received packet by virtue of the primary control module and the extended control interface module in the security processing device, which can be implemented by the following technical solutions. The technical solutions are described by taking an example that the interface module 1 in the primary security processing device 1101 receives the packet. When the packet received by the interface module 1 in the primary security processing device 1101 is a first packet, the interface module 1 requests the primary control module in the primary security processing device 1101 to instruct the service processing module used to processing the traffic flow corresponding to the received packet, i.e. the primary control module in the primary security processing device 1101 generates the processing instruction; the interface module 1 regards the service processing module instructed by the primary control module in the primary security processing device 1101 as the service processing module used to process the received packet, and records the service processing module used to process the traffic flow corresponding to the received packet. When the received packet is a non-first packet, the interface module 1 searches for the recorded security processing device used to process the traffic flow corresponding to the received packet, and regards the searched out security processing device as the security processing device used to process the packet.

In the above example, the primary control module in the primary security processing device 1101 receives the request sent by the interface module 1, selects a service processing module used to process the traffic flow corresponding to the received packet, and instructs the interface module 1 with the selected service processing module, i.e. generates the processing instruction. Preferably, the processing instruction is sent to the secondary security processing device via the extended control interface module.

In the above example, if the secondary security processing device 1102 receives the external packet, the primary control in the secondary security processing device 1102 sends a request for processing the external packet to the extended interface module, and sends an instruction returned by the extended interface module to the interface module receiving the external packet. The external packet is processed by a service processing module in the secondary security processing device 1102 indicated by the returned instruction.

In this embodiment, the primary control module in the primary security processing device 1101 selects the service processing module used to process the current packet by the following technical solutions. The service processing modules in the primary security processing device 1101 and in the secondary security processing device 1102 periodically report state information of the service processing modules containing processing capabilities of the service processing modules to the primary control modules in the security processing devices where the service processing modules are located. The primary control module in the secondary security processing device 1102 periodically sends the collected state information of the service processing modules to the primary security processing device 1101 via the extended control interface module. The primary control module in the primary security processing device 1101 receives the state information sent by the service processing module in the primary security processing device 1101 and the state information sent by the secondary security processing device 1102 via the extended control interface module; and if the external packet is a first packet of the traffic flow, the service processing module used to process the traffic flow is selected according to the processing capability of the service processing modules.

In the extended security system shown in FIG. 11, two security processing devices are combined, and the interface modules and service processing modules are shared between the two security processing devices. Compared with the original single security processing device, the extended security system can improve the processing capabilities, share interfaces of the security processing devices, and implement high-efficiency combination of the security processing devices.

In some specific applications, only the number of interfaces in the security system or the processing capability of the security system needs to be extended. Therefore, in order to save resources, it is unnecessary to combine two security processing devices including multiple interface modules and multiple service processing modules to form one security system. When only the number of the interfaces needs to be increased, a security system shown in FIG. 12 may be adopted; and when only the processing capability needs to be improved, a security system shown in FIG. 13 may be adopted.

Figure 12:
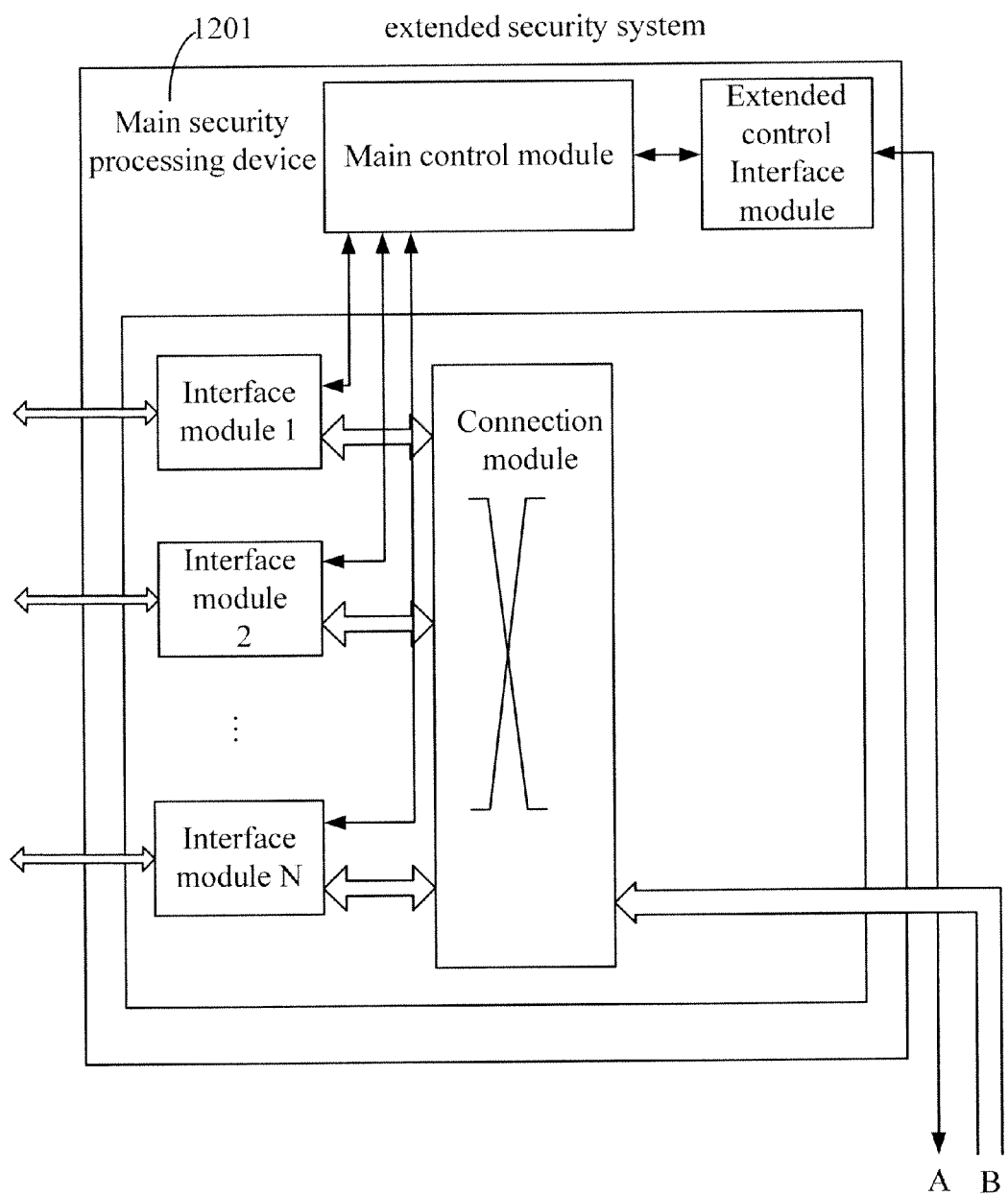
FIG. 12 is a schematic diagram illustrating a structure of a security system in accordance with a tenth embodiment of the present invention.
Figure 12:
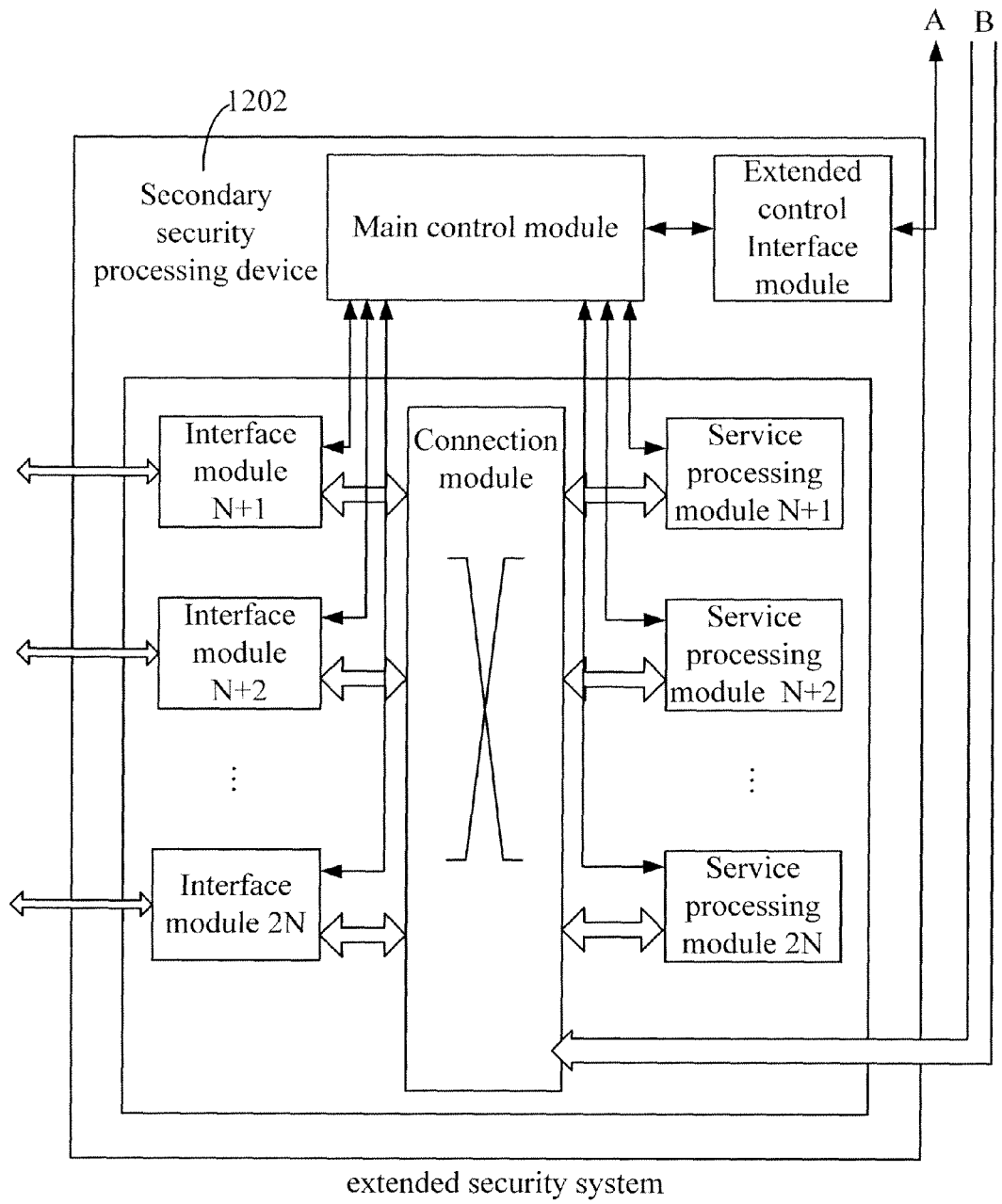

FIG. 12 is a schematic diagram illustrating a structure of a security system in accordance with a tenth embodiment of the present invention. The security system includes a primary security processing device 1201 and a secondary security processing device 1202. The structure of the secondary security processing device 1202 is the same as that of the secondary security processing device 1102 shown in FIG. 11, and are not further described herein. The primary security processing device 1201 includes a primary control module, an extended control interface module, a connection module and multiple interface modules. Any one interface module is connected with the connection module. In the primary security processing device 1201, each interface module is connected with the primary control module, and is adapted to send a request for processing a received external packet to the primary control module, and send the external packet via the connection module to a service processing module used to process the received external packet selected by the primary control module.

Since the primary security processing device 1201 only includes the interface modules and does not include a service processing module, the primary security processing device 1201 does not have the capability of processing packets, and only can receive and send packets, which can refer to the description about the signal flow □ shown in FIG. 11. In addition, the mode of determining the service processing module used to process the currently received external packet is similar to the technical solution described in the ninth embodiment of the present invention, and is not further described herein.

Figure 13:
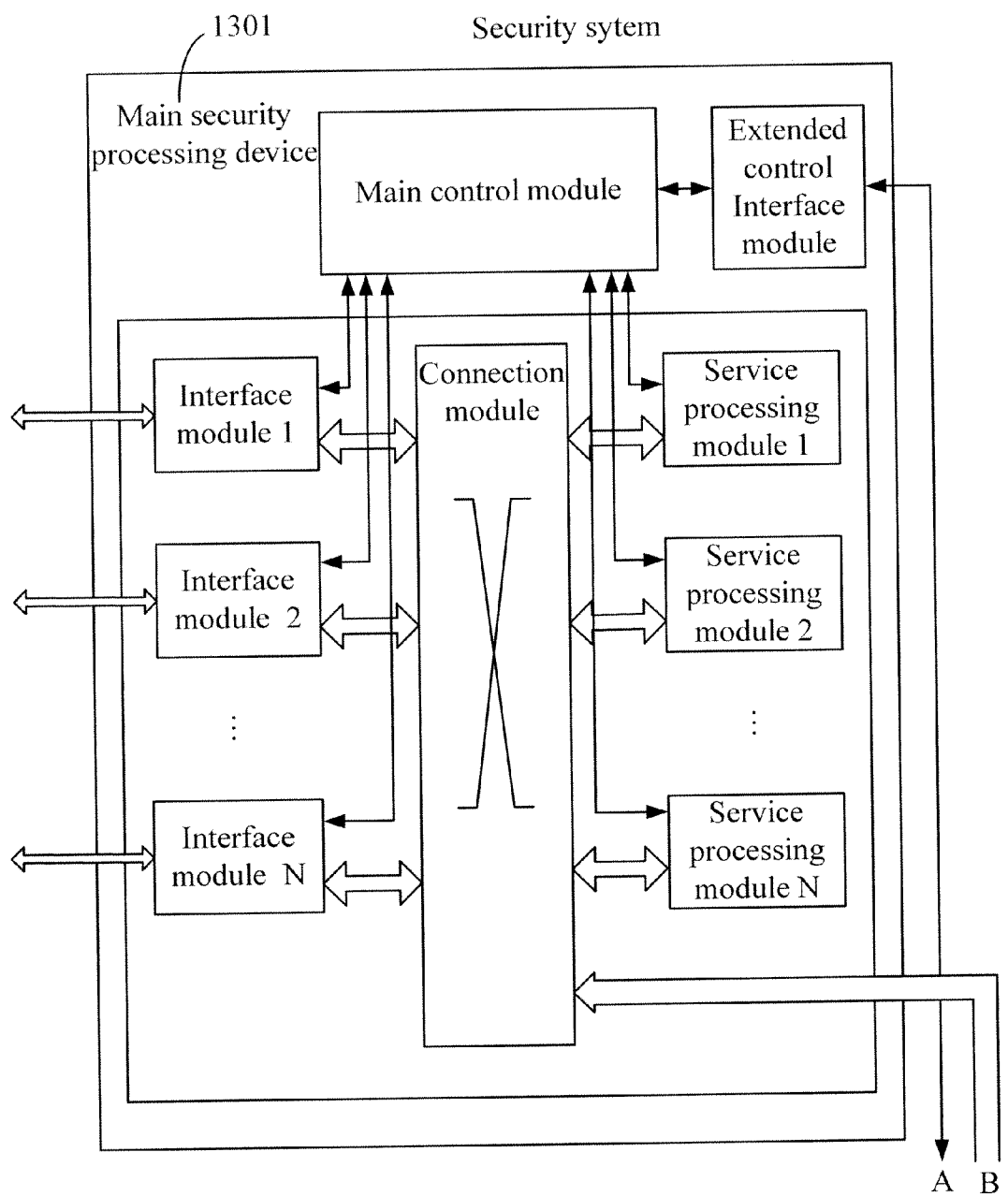
FIG. 13 is a schematic diagram illustrating a structure of a security system in accordance with an eleventh embodiment of the present invention.
Figure 13:
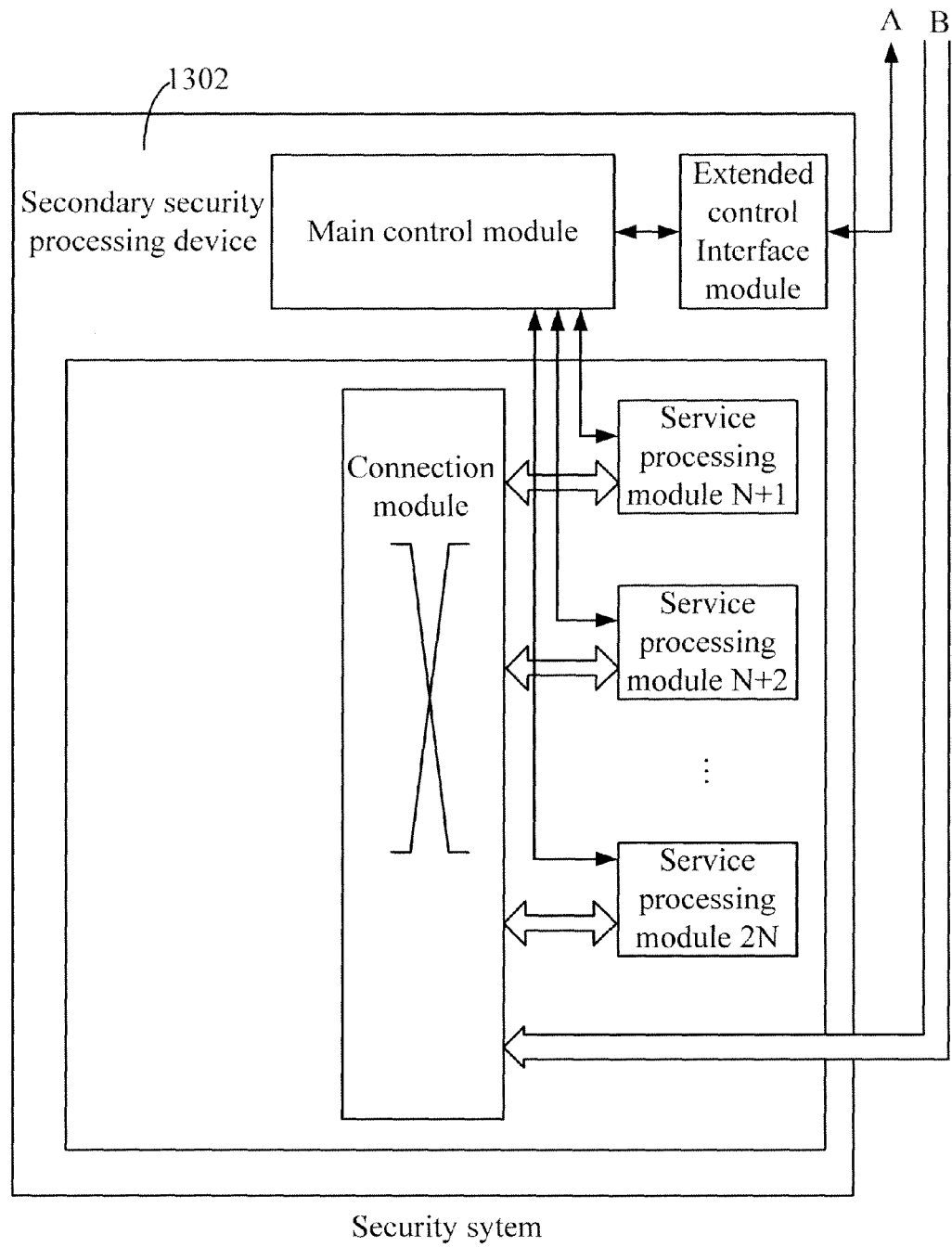

FIG. 13 is a schematic diagram illustrating a structure of a security system in accordance with an eleventh embodiment of the present invention. The security system includes a primary security processing device 1301 and a secondary security processing device 1302. The structures of the primary security processing device 1301 is the same as the primary security processing device 1101 shown in FIG. 11, and is not further described herein. The secondary security processing device 1302 includes a primary control module, an extended control interface module, a connection module and multiple service processing modules. Any one service processing module is connected with the connection module. In the secondary security processing device 1302, each service processing module is connected with the primary control module, and is adapted to send state information containing its own processing capability to the primary control module, and the primary control module sends the state information to the primary control module in the primary security processing device 1301 via the extended control interface module, so that the primary control module selects the service processing module having the processing capability.

Since the secondary security processing device 1302 only includes the service processing modules and does not includes an interface module, the secondary security processing device 1302 does not have the capability of receiving and sending packets, and only can process packets. In this embodiment, the mode of selecting the service processing module used to process the currently received packet is similar to the technical solution described in the ninth embodiment of the present invention, and is not further described herein.

According to the description in the above FIGS. 4 to 13, it is not difficult for those skilled in the art to form an extended security system according to primary security processing devices and secondary security processing devices provided by the embodiments of the present invention. The extended security system includes one primary security processing device which is any one of the primary security processing device 400, the primary security processing device 500, the primary security processing device 600 and the primary security processing device 700, and a secondary security processing device consisting of at least one of the secondary security processing device 800, the secondary security processing device 900 and the secondary security processing device 1000. Detailed structures and connection relations are similar to those described in the eighth, ninth and tenth embodiments of the present invention, and are not further described herein, which can refer to FIGS. 3, 11, 12 and 13.

In the embodiments of the present invention, the primary control module and the extended control interface module in the security processing device can select the service processing module used to process the traffic flow, and can also perform initialization configuration for the interface module and the service processing module in the security processing device, e.g. distribute addresses. Generally, the whole initialization process is controlled by the primary security processing device.

Herein, there are two methods for determining the primary security processing device. One method includes: configuring one security processing device as the primary security processing device when the security system is established, and configuring a frame number used to indicate the security processing device as a special frame number of the primary security processing device to prompt other security processing devices. For example, the security processing device with a frame number of 0 is the primary security processing device. The other method includes negotiating via broadcast packets during the initialization process of the security system to determine the primary security processing device. Specifically, the negotiating may include that: each security processing device generates a random value, and a security processing device is selected from the security processing devices as the primary security processing device according to the random values.

Specifically, detailed configuration process in the security system may includes that: after each security processing device in the security system determines its own role, the primary control module in the secondary security processing device is adapted to collect physical information of each module in the security processing device, including physical information of the interface modules and the service processing modules, start each module, and send the collected physical information to the primary control module in the primary security processing device. The primary control module in the primary security processing device needs to collect physical information of each module in the primary security processing device, and also needs to receive the physical information sent by other secondary security processing devices. The primary security processing device obtains configuration information according to the collected physical information. The method for obtaining the configuration information may be determined by an administrator or generated by the primary security processing device.

In addition, when a new interface module and/or service processing module are added to the security system, the primary control module in the security processing device where the interface module and/or service processing module are located receives physical information of the newly added interface module and/or service processing module. When the security processing device where the primary control module is located is a primary security processing device, the primary control module obtains configuration information of the newly added interface module and/or service processing module according to the physical information, and sends the configuration information to the newly added interface module and/or service processing module to perform initialization configuration. When the security processing device where the primary control module is located is not the primary security processing device, the primary control module sends the collected physical information to the primary security processing device, and sends the configuration information received from the primary security processing device to the newly added interface module and/or service processing module to perform initialization configuration. When an interface module and/or service processing module is pulled out, the primary security processing device needs to generate, according to the traffic flow processed by the pulled out interface module and/or service processing module, configuration information used to switch the traffic flow to another interface module and/or service processing module to be processed.

The security system of the present invention may be a firewall, an IPS system, or other L4~L7 network systems.

The above are only exemplary embodiments of the present invention. The protection scope of the present invention, however, is not limited to the above description. Any change or substitution, within the technical scope disclosed by the present invention, easily occurring to those skilled in the art should be covered by the protection scope of the present invention.

The invention claimed is:

1. A primary security processing device in an extended security system, wherein the extended security system further comprises at least one secondary security processing device connected with the primary security processing device, and the primary security processing device comprises a primary control module, an interface module and a connection module, wherein
the primary control module is configured to, when receiving a request of processing an external packet and the external packet is a first packet of a traffic flow, select a security processing device for processing the traffic flow corresponding to the first packet according to processing capabilities of the primary security processing device and the at least one secondary security processing device, wherein the selected security processing device is one of the primary security processing device and the at least one secondary security processing device; and further configured to, when a secondary security processing device is selected, generate instruction information for instructing the interface module to send the received first packet to the selected secondary security processing device via the connection module, and instruct the interface module to record information that the secondary security processing device selected by the primary control module is used to process the traffic flow corresponding to the first packet;
the interface module is connected respectively with the connection module and the primary control module, and is configured to receive the first packet, send the request of processing the first packet to the primary control module, send the first packet to the secondary security processing device selected by the primary control module via the connection module, and record the information that the secondary security processing device selected by the primary control module is used to process the traffic flow corresponding to the first packet; and further configured to receive a subsequent packet of the traffic flow, search for the secondary security processing device for processing the first packet from the information recorded in the interface module, and send the subsequent packet to the secondary security processing device for processing the first packet via the connection module; and
the connection module is connected respectively with the interface module and the secondary security processing device, and is configured to send the received first packet to the secondary security processing device selected by the primary control module and send the subsequent packet to the secondary security processing device for processing the first packet;
wherein the primary control module, the interface module and the connection module are implemented by one or more hardware processors.

2. A primary security processing device in an extended security system, wherein the extended security system further comprises at least one secondary security processing device connected with the primary security processing device, and the primary security processing device comprises a primary control module, an extended control interface module, a connection module and a service processing module, wherein
the primary control module is configured to, when receiving a request of processing an external packet and the external packet is a first packet of a traffic flow, select a security processing device for processing the traffic flow corresponding to the first packet according to processing capabilities of the primary security processing device and the at least one secondary security processing device, wherein the selected security processing device is one of the primary security processing device and the at least one secondary security processing device; and further configured to, when a secondary security processing device is selected, generate instruction information for indicating the selected secondary security processing device to process the first packet, send the instruction information via the extended control interface module to the selected secondary security processing device, and instruct a secondary security processing device receiving the first packet to record information that the secondary security processing device selected by the primary control module is used to process the traffic flow corresponding to the first packet; when the primary security processing device is selected, instruct the secondary security processing device receiving the first packet to send the first packet to the connection module, and instruct the service processing module to process the first packet; and instruct the secondary security processing device receiving the first packet to record information that the primary security processing device is used to process the traffic flow corresponding to the first packet;
the extended control interface module is connected respectively with the primary control module and the secondary security processing device, and is configured to receive the request of processing the first packet from the secondary security processing device receiving the first packet, and send the instruction information generated by the primary control module to the selected secondary security processing device and sending the instruction of the primary control module to the secondary security processing device receiving the first packet;
the connection module is connected respectively with the service processing module and the secondary security processing device, and is configured to receive the first packet sent from the secondary security processing device receiving the first packet, and send the first packet to the service processing module to be processed; and
the service processing module is connected respectively with the connection module and the primary control module, and is configured to process the first packet received by the connection module according to the instruction of the primary control module
wherein the primary control module, the extended control interface module, the connection module and the service processing module are implemented by one or more hardware processors.

3. A primary security processing device in an extended security system, wherein the extended security system further comprises at least one secondary security processing device connected with the primary security processing device, and the primary security processing device comprises a primary control module, an interface module, a connection module and a service processing module, wherein the primary control module is configured to, when receiving a request of processing an external packet and the external packet is a first packet of a traffic flow, select a security processing device for processing the traffic flow corresponding to the first packet according to processing capabilities of the primary security processing device and the at least one secondary security processing device, wherein the selected security processing device is one of the primary security processing device and the at least one secondary security processing device; and further configured to, when a secondary security processing device is selected to process the first packet, instruct a security processing device receiving the first packet to send the received first packet to the selected secondary security processing device, and instruct the security processing device receiving the first packet to record information that the secondary security processing device selected by the primary control module is used to process the traffic flow corresponding to the first packet; when the primary security processing device is selected to process the first packet, instruct the service processing module to process the first packet received, via the connection module, from the security processing device receiving the first packet, and instruct the interface module to record information that the primary security processing device is used to process the traffic flow corresponding to the first packet;

the interface module is connected respectively with the connection module and the primary control module, and is configured to receive the first packet, send the request of processing the first packet to the primary control module, and record the information that the security processing device selected by the primary control module is used to process the traffic flow corresponding to the first packet; and further configured to receive a subsequent packet of the traffic flow, search for the security processing device for processing the first packet according to the information recorded in the interface module, and send the subsequent packet to the security processing device for processing the first packet via the connection module;

the connection module is connected respectively with the interface module, the service processing module and the secondary security processing device, and is configured to send the first packet to the selected secondary security processing device to be processed if the primary control module selects the secondary security processing device; or receive the first packet sent by the secondary security processing device receiving the first packet;

the service processing module is connected respectively with the connection module and the primary control module, and is configured to process the first packet sent by the connection module according to the instruction of the primary control module;

wherein the primary control module, the interface module, the connection module and the service processing module are implemented by one or more hardware processors.

4. A method for using an extended security system, comprising: configuring one of security processing devices in the extended security system as a primary security processing device and configuring other security processing devices as at least one secondary security processing device connected with the primary security processing device, wherein the primary security processing device comprises a primary control module, an interface module and a connection module, and the method comprises:

receiving, by the interface module, an external packet, and, when the external packet is a first packet of a traffic flow, sending a request of processing the first packet to the primary control module;

when receiving the request of processing the first packet, selecting, by the primary control module, a security processing device for processing the traffic flow corresponding to the first packet according to processing capabilities of the primary security processing device and the at least one secondary security processing device, wherein the selected security processing device is one of the primary security processing device and the at least one secondary security processing device;

when a secondary security processing device is selected, generating, by the primary control module, instruction information for instructing the interface module to send the received first packet to the selected secondary security processing device via the connection module, and instructing the interface module to record information that the secondary security processing device selected by the primary control module is used to process the traffic flow corresponding to the first packet;

sending, by the interface module, the first packet to the connection module, and recording the information that the secondary security processing device selected by the primary control module is used to process the traffic flow corresponding to the first packet;

sending, by the connection module, the received first packet to the secondary security processing device selected by the primary control module;

receiving, by the interface module, a subsequent packet of the traffic flow, searching for the secondary security processing device for processing the first packet from the information recorded in the interface module, and sending the subsequent packet to the connection module; and sending, by the connection module, the subsequent packet to the secondary security processing device for processing the first packet.

5. A method for using an extended security system, comprising: configuring one of security processing devices in the extended security system as a primary security processing device and configuring other security processing devices as at least one secondary security processing device connected with the primary security processing device, wherein the primary security processing device comprises a primary control module, an extended control interface module, a connection module and a service processing module, and the method comprises:

receiving, by the extended control interface module, a request of processing a first packet of a traffic flow from a secondary security processing device receiving the first packet, and sending the request of processing the first packet to the primary control module;

when receiving the request of processing the first packet, selecting, by the primary control module, a security processing device for processing the traffic flow corresponding to the first packet according to processing capabilities of the primary security processing device and the at least one secondary security processing device, wherein the selected security processing device is one of the primary security processing device and the at least one secondary security processing device;

when a secondary security processing device is selected, generating, by the primary control module, instruction information for indicating the selected secondary security processing device to process the first packet, sending the instruction information via the extended control interface module to the selected secondary security processing device, and instructing the secondary security processing device receiving the first packet to record information that the secondary security processing device selected by the primary control module is used to process the traffic flow corresponding to the first packet;

when the primary security processing device is selected, instructing, by the primary control module, the secondary security processing device receiving the first packet to send the first packet to the connection module, instructing the service processing module to process the first packet, and instructing the secondary security processing device receiving the first packet to record information that the primary security processing device is used to process the traffic flow corresponding to the first packet;

sending, by the extended control interface module, the instruction information generated by the primary control module to the selected secondary security processing device and sending the instruction of the primary control module to the secondary security processing device receiving the first packet;

receiving, by the connection module, the first packet from the secondary security processing device receiving the first packet, and sending the first packet to the service processing module to be processed; and processing, by the service processing module, the first packet received by the connection module according to the instruction of the primary control module.

6. A method for using an extended security system, comprising: configuring one of security processing devices in the extended security system as a primary security processing device and configuring other security processing devices as at least one secondary security processing device connected with the primary security processing device, wherein the primary security processing device comprises a primary control module, an interface module, a connection module and a service processing module, and the method comprises:

receiving, by the interface module, a first packet of a traffic flow, sending a request of processing the first packet to the primary control module;

when receiving the request of processing the first packet, selecting, by the primary control module, a security processing device for processing the traffic flow corresponding to the first packet according to processing capabilities of the primary security processing device and the at least one secondary security processing device, wherein the selected security processing device is one of the primary security processing device and the at least one secondary security processing device;

when a secondary security processing device is selected to process the first packet, instructing, by the primary control module, a security processing device receiving the first packet to send the received first packet to the selected secondary security processing device, and instructing the security processing device receiving the first packet to record information that the secondary security processing device selected by the primary control module is used to process the traffic flow corresponding to the first packet;

sending, by the connection module, the first packet to the selected secondary security processing device to be processed if the primary security processing device receives the first packet;

when the primary security processing device is selected to process the first packet, instructing, by the primary control module, the service processing module to process the first packet received, and instructing the interface module to record information that the primary security processing device is used to process the traffic flow corresponding to the first packet;

receiving, by the connection module, the first packet if a secondary security processing receives the first packet, and sending the first to the service processing module;

recording, by the interface module, the information that the security processing device selected by the primary control module is used to process the traffic flow corresponding to the first packet;

processing, by the service processing module, the first packet sent by the connection module according to the instruction of the primary control module; and receiving, by the interface module, a subsequent packet of the traffic flow, searching for the security processing device for processing the first packet according to the information recorded in the interface module, and sending the subsequent packet to the security processing device for processing the first packet via the connection module.

* * * * *

UNITED STATES PATENT AND TRADEMARK OFFICE
CERTIFICATE OF CORRECTION

PATENT NO. : 8,713,663 B2
APPLICATION NO. : 12/676503
DATED : April 29, 2014
INVENTOR(S) : Wanquan An It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this
Twenty-ninth Day of September, 2015

Michelle K. Lee
*Director of the United States Patent and Trademark Office*